United States Patent [19]
Yoshida et al.

[11] Patent Number: 5,583,671
[45] Date of Patent: Dec. 10, 1996

[54] METHOD OF MANUFACTURING POLYMER DISPERSED LIQUID CRYSTAL DISPLAY DEVICES

[75] Inventors: Tetsushi Yoshida, Hachioji; Jiro Takei, Tama, both of Japan

[73] Assignee: Casio Computer Co., Ltd., Tokyo, Japan

[21] Appl. No.: 147,118

[22] Filed: Nov. 2, 1993

[30] Foreign Application Priority Data

| Nov. 9, 1992 | [JP] | Japan | 4-298695 |
| Nov. 17, 1992 | [JP] | Japan | 4-306895 |
| Dec. 24, 1992 | [JP] | Japan | 4-343714 |
| Dec. 24, 1992 | [JP] | Japan | 4-343979 |

[51] Int. Cl.⁶ .............................. G02F 1/137; G02F 1341
[52] U.S. Cl. .............................. 349/93; 349/188; 349/189
[58] Field of Search .............................. 359/51, 52, 90; 264/4.1, 4.7; 428/1; 430/20; 252/299.01

[56] References Cited

U.S. PATENT DOCUMENTS

| 4,938,568 | 7/1990 | Margerum et al. | 359/51 |
| 5,087,114 | 2/1992 | Fukui et al. | 359/81 |
| 5,211,876 | 5/1993 | Vaz et al. | 252/299.01 |
| 5,301,046 | 4/1994 | Konuma et al. | 359/51 |
| 5,305,126 | 4/1994 | Kobayashi et al. | 359/52 |
| 5,328,728 | 7/1994 | Swirbel et al. | 359/81 |
| 5,426,522 | 6/1995 | Takahara et al. | 359/52 |
| 5,519,519 | 5/1996 | Nakajima et al. | 359/51 |

*Primary Examiner*—William L. Sikes
*Assistant Examiner*—Tai V. Duong
*Attorney, Agent, or Firm*—Frishauf, Holtz, Goodman, Langer & Chick

[57] ABSTRACT

A pair of transparent substrates are arranged to oppose each other and bonded to each other through a seal member. A polymer dispersed liquid crystal layer and spacers are provided between the pair of transparent substrates. A plurality of pixel electrodes respectively provided with TFTs are disposed in a matrix form on the counter surface of one substrate opposing the other substrate, and the spacers for regulating the gap between the substrates are fixed, through resin films, to remaining regions of the counter surface of one substrate obtained by excluding pixel regions corresponding to the pixel electrodes from the region inside the seal member. A black mask is formed on the remaining regions of the counter surface of the other transparent substrate, and a flat counter electrode opposing the plurality of pixel electrodes is formed on the black mask. The polymer dispersed liquid crystal display device is obtained by injecting, into a cell in a vacuum state, a solution mixture of a photo-setting polymeric material and a liquid crystal material that are mixed in a formulating proportion not less than a solubility at a normal temperature and a normal pressure, increasing the temperature of the solution mixture to a temperature not less than the soluble limit temperature of the liquid crystal, and thereafter photo-setting the photo-setting polymeric material.

19 Claims, 6 Drawing Sheets

METHOD OF MANUFACTURING POLYMER DISPERSED LIQUID CRYSTAL DISPLAY DEVICES

BACKGROUND OF THE INVENTION

1. Field of the Invention

The present invention relates to a polymer dispersed liquid crystal display device and a method of manufacturing the same.

2. Description of the Related Art

A polymer dispersed liquid crystal is obtained by dispersing a nematic liquid crystal in a transparent polymeric material. In a liquid crystal display device using the polymer dispersed liquid crystal, a polymer dispersed liquid crystal layer is provided between a pair of transparent substrates on which transparent electrodes are formed.

A transmission type liquid crystal display device having the polymer dispersed liquid crystal layer is driven when an electric field is applied across the electrodes of the two substrates, so that display is performed. The molecules of the liquid crystal in the polymer dispersed liquid crystal layer are directed in various directions when an electric field is not applied. In this state, light transmitted through the polymer dispersed liquid crystal layer is scattered by the light-scattering function caused by the liquid crystal and by the light-scattering function that occurs at the interface between the liquid crystal and the polymeric material. Hence, a portion of the display device to which the electric field is not applied is set in a dark display state which is close to black.

When an electric field higher than the threshold voltage of the liquid crystal is applied across the electrodes, the molecules of the liquid crystal are uniformly aligned so as to be perpendicular to the surfaces of the substrates. Then, the transmitted light is transmitted through the polymer dispersed liquid crystal layer without substantially being subjected to the light-scattering function. Hence, a portion of the display device to which the electric field is applied is set in a bright display state.

Since the polymer dispersed liquid crystal display device realizes display by controlling the amount of transmitted light and the amount of scattered light, it does not need a polarizing plate. Therefore, this polymer dispersed liquid crystal display device can obtain brighter display than that of a conventional TN liquid crystal display device.

In recent years, it is proposed to adapt the polymer dispersed liquid crystal display device having the above advantages to an active matrix type liquid crystal display device which is driven by a thin film transistor (to be referred to as a TFT hereinafter). Although the TFT-driven polymer dispersed liquid crystal display device can be driven in a high time-division manner and can obtain a bright and high-definition dot display image, it is difficult to obtain a high contrast. This is because at the portion among adjacent pixels to which an electric field is not applied, light is always scattered by the polymer dispersed liquid crystal, and the scattered light leaks to the outside.

The liquid crystal display device is manufactured in accordance with a method wherein the device is assembled by bonding a pair of substrates through a frame-shaped seal member, a solution obtained by mixing a monomer of a photo-setting polymeric material and a liquid crystal is filled in the device, and thereafter, the monomer of the polymeric material is polymerized by light radiation, thereby forming a polymer dispersed liquid crystal layer. If, however, the gap between the substrates of the device assembled in this manner is non-uniform, the thickness of the polymer dispersed liquid crystal layer formed between the substrates becomes non-uniform to cause non-uniformity in display. For this reason, conventionally, transparent substrate gap regulating spacers made of spherical grass particles or short glass fibers are distributed between a pair of substrates. The substrate gap is regulated by these spacers, thereby setting the thickness of the polymer dispersed liquid crystal layer substantially uniform throughout the entire layer.

However, in the conventional liquid crystal display device, light that passes through portions where the substrate gap regulating spacers are located is transmitted through the spacers and emitted without substantially being scattered. Therefore, bright spots corresponding to the shapes of the spacers appear in the dark display region which is displayed by light scattering in the polymer dispersed liquid crystal layer. The display quality is degraded by the bright spots.

Especially, in the TFT-driven polymer dispersed liquid crystal display device which is often used for small-pixel high-definition display, e.g., a video display, occurrence of bright spots as described above in the small pixel poses a serious problem.

Furthermore, although the polymer dispersed liquid crystal display device has a bright screen, it requires a high drive voltage since the liquid crystal is dispersed in the resin, so that it is hindered from being put into practical use as a display device. Therefore, it is conventionally proposed to increase the proportion of the liquid crystal in the polymer dispersed liquid crystal layer. If the proportion of the liquid crystal in the polymer dispersed liquid crystal layer is increased, the voltage drop caused by the resin component is decreased by the increase in proportion of the liquid crystal, thereby decreasing the drive voltage. According to the conventional manufacturing method, however, if the proportion of the liquid crystal in the solution mixture to be injected into the cell is increased, a polymer dispersed liquid crystal layer in which the liquid crystal is uniformly dispersed cannot be obtained, causing display non-uniformity in the polymer dispersed liquid crystal display device. This is due to the following reason.

Namely, even if the solution mixture is composed by dissolving the liquid crystal in the saturated state, when the solution mixture is injected into the cell in accordance with vacuum injection, the pressure of the mixture injected in the cell in the vacuum state is decreased to decrease the solubility of the liquid crystal. When the solubility of the liquid crystal of the mixture is decreased, an amount of liquid crystal that exceeds the solubility is separated to form in the mixture a liquid crystal mass constituted by only the gathered liquid crystal. To form the polymer dispersed liquid crystal layer, the mixture is injected into the cell, and thereafter the photo-setting resin in the mixture is subjected to photopolymerization. Hence, if a liquid crystal mass is present in the mixture, the dispersed state of the liquid crystal in the polymer dispersed liquid crystal layer becomes non-uniform, and thus the optical characteristics (transmitting and scattering characteristics) of the polymer dispersed liquid crystal layer become non-uniform, causing display non-uniformity.

In photopolymerization described above, if a smooth polymerization reaction of polymers is interfered with by the molecules of the liquid crystal, the structure of a uniform polymer dispersed liquid crystal layer cannot be obtained, and the optical characteristics become non-uniform, thereby causing display non-uniformity.

SUMMARY OF THE INVENTION

It is an object of the present invention to provide a TFT-driven polymer dispersed liquid crystal display device capable of obtaining bright and high-definition display by high duty time-division driving at a high contrast.

In order to achieve the above object, according to an aspect of the present invention, there is provided a polymer dispersed liquid crystal display device comprising: a pair of substrates which are spaced in parallel so as to face each other at a predetermined gap, one of the pair of substrates being transparent; a plurality of pixel electrodes arranged on one of the pair of substrates in a matrix form; a counter electrode arranged on the other of the substrates to oppose the plurality of pixel electrodes; a plurality of thin film transistors provided to the pixel electrodes respectively; a polymer dispersed liquid crystal layer existing between the pair of substrates and obtained by mixing a liquid crystal in a polymeric in a dispersed state, the layer having first regions corresponding to the pixel electrodes and second regions between the first regions; light-shielding means disposed at the second regions in the polymer dispersed liquid crystal layer; and substrate gap regulating means, provided in the polymer dispersed liquid crystal layer, for regulating a gap between the pair of substrates.

When the polymer dispersed liquid crystal display device is arranged in the manner as described above, light incident on the second regions and scattered by the polymer dispersed liquid crystal is reliably prevented by the light-shielding means from emerging to the outside. Accordingly, the contrast of the display image obtained by the TFT-driven polymer dispersed liquid crystal display device is increased, and a bright, high-contrast, high-definition display image can be obtained by high time-division driving.

In the polymer dispersed liquid crystal display device described above, the substrate gap regulating means is preferably disposed in the second regions on one substrate. In this case, grass particles may preferably used as the substrate gap regulating means. Grass particles having at least black surfaces may be used as the light-shielding means serving also as the substrate gap regulating means. Furthermore, the substrate gap regulating means may comprise gap regulating members and fixing members for fixing the gap regulating members to the substrate. In this case, a resin film made of a photo-setting polymeric material, e.g., photosensitive polyimide or a photoresist, may be provided as the fixing member between the gap regulating member and the substrate.

The polymer dispersed liquid crystal display device may use a member having light-scattering performance as the substrate gap regulating means. In this case, grass particles having rough surfaces are suitably used as the member having the light-scattering performance.

According to the polymer dispersed liquid crystal display device described above, light transmitted through the substrate gap regulating means is reliably prevented from leaking to the outside to form bright spots in the dark display region, so that the display contrast is further improved.

According to another aspect of the present invention, there is provided a polymer dispersed liquid crystal display device comprising: a pair of substrates which are spaced in parallel so as to face each other at a predetermined gap one of the pair of substrates being transparent; a plurality of pixel electrodes arranged on one of the pair of substrates in a matrix form; a counter electrode arranged on the other of the substrates to oppose the plurality of pixel electrodes; a plurality of thin film transistors provided to the pixel elec-trodes respectively; a polymer dispersed liquid crystal layer existing between the pair of substrates and obtained by mixing a liquid crystal in a polymeric material in a dispersed state; and substrate gap regulating members, distributed in the polymer dispersed liquid crystal layer and having a light-scattering performance, for regulating a gap between the pair of substrates.

When the polymer dispersed liquid crystal display device is arranged in the manner as described above, since the substrate gap regulating members have high light-scattering performance, even light passing through a portion where the substrate gap regulating member is located is scattered in the same manner as in light scattering that occurs at a portion where an electric field is not applied in accordance with TFT driving of the polymer dispersed liquid crystal layer. Then, the dark display region has substantially the uniform darkness throughout its entire region, so that bright spots do not appear in the dark display region.

In the polymer dispersed liquid crystal display device described above, grass particles having rough surfaces are suitably used as the substrate gap regulating members having the light-scattering performance.

It is another object of the present invention to provide a method of manufacturing a polymer dispersed liquid crystal display device, which method is capable of forming a polymer dispersed liquid crystal layer in which a liquid crystal is uniformly dispersed even when the formulating proportion of the liquid crystal is increased.

In order to achieve the above object, according to the present invention, there is provided a method of manufacturing a polymer dispersed liquid crystal display device, comprising: a step of forming a liquid crystal cell by filling a solution mixture, containing a photosetting polymeric material and a liquid crystal material, between a pair of opposite substrates, the solution mixture having a temperature not less than a soluble limit temperature which is a lower limit temperature at which the two materials are dissolved with each other in an atmospheric pressure; and a step of setting the photo-setting polymeric material by radiating light on the solution mixture.

According to the method of manufacturing the polymer dispersed liquid crystal display device described above, a polymer dispersed liquid crystal display device, in which the photo-setting polymeric material is set while a large amount of liquid crystal material is dissolved in the photo-setting polymeric material and the large amount of liquid crystal is held in the photoset polymeric material layer in a uniformly dispersed state, is constantly formed. Then, the polymer dispersed liquid crystal display device that can be driven at a low voltage can be reliably obtained.

In the method of manufacturing the polymer dispersed liquid crystal display device, the cell formation step preferably comprises a step of filling the solution mixture, containing the two materials at a proportion not less than a solubility at a normal temperature and a normal pressure, between the pair of substrates in a vacuum state, and a step of increasing the temperature of the solution mixture to a temperature not less than the soluble limit temperature. In this case, the temperature rise step may be executed after the filling step, or the temperature rise step may be executed before and after the filling step, respectively. The setting step preferably comprises a step of decreasing the temperature of the solution mixture within a range not less than the soluble limit temperature and a step of polymerizing the photo-setting polymeric material by radiating light on the solution mixture, a temperature of which is decreased. When the temperature rise step is executed before and after the filling step, the temperature of the solution mixture may be preferably increased up to the soluble limit temperature in the preceding temperature rise step, and the temperature of the solution mixture may be preferably increased to a temperature not less than the N—I point of the liquid crystal in the succeeding temperature rise step. In this case, the photopolymerization step may be preferably executed after setting is executed in the setting step by setting the temperature of the solution mixture in a range not more than the N—I point of the solution mixture and not less than the soluble limit temperature.

In the method of manufacturing the polymer dispersed liquid crystal display device described above, the temperature of the solution mixture may be increased to not less than the N—I point in the cell formation step after the filling step, or the temperature of the solution mixture may be increased to not less than the N—I point before the filling step and the temperature of the solution mixture may be further increased after the filling step. In either case, the solution mixture may be photopolymerized after the temperature of the solution mixture which is increased to not less than the N—I point is decreased within the range not less than the N—I point. Alternatively, the solution mixture may be photopolymerized after its temperature is decreased in the range not more than the N—I point and not less than the soluble limit temperature.

Furthermore, in the method of manufacturing the polymer dispersed liquid crystal display device described above, the polymeric material is preferably polymerized in the setting step by radiating light on the solution mixture while dispersedly mixing it. In this case, the solution mixture is preferably dispersedly mixed by ultrasonic vibration.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The preferred embodiments of the present invention will be described with reference to FIG. 1 to FIG. 9.

Figure 1:
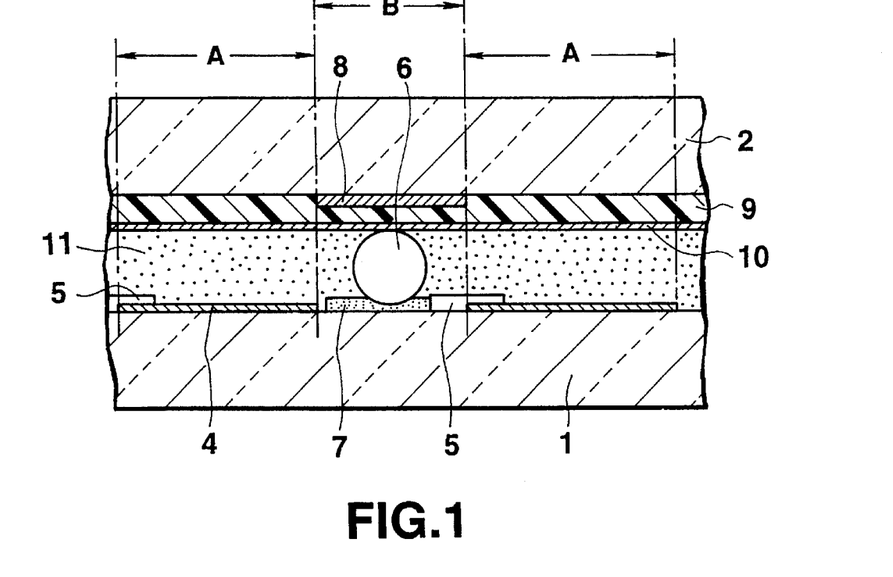
FIG. 1 is a sectional view showing part of an embodiment of a polymer dispersed liquid crystal display device according to the present invention.
Figure 2:
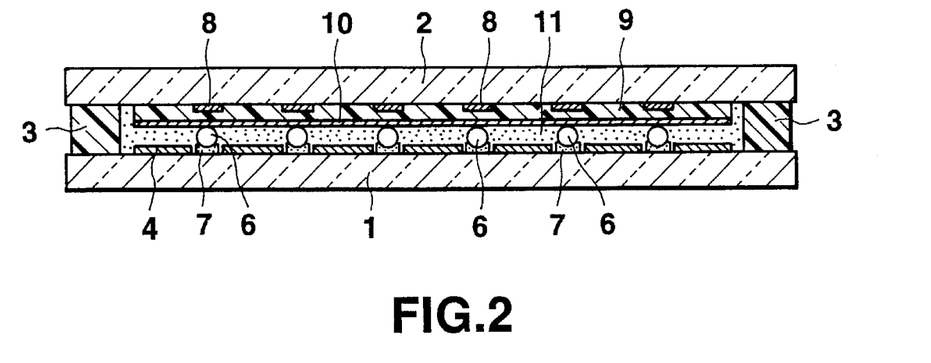
FIG. 2 is a sectional view showing the overall structure of the embodiment of the polymer dispersed liquid crystal display device according to the present invention.
Figure 3:
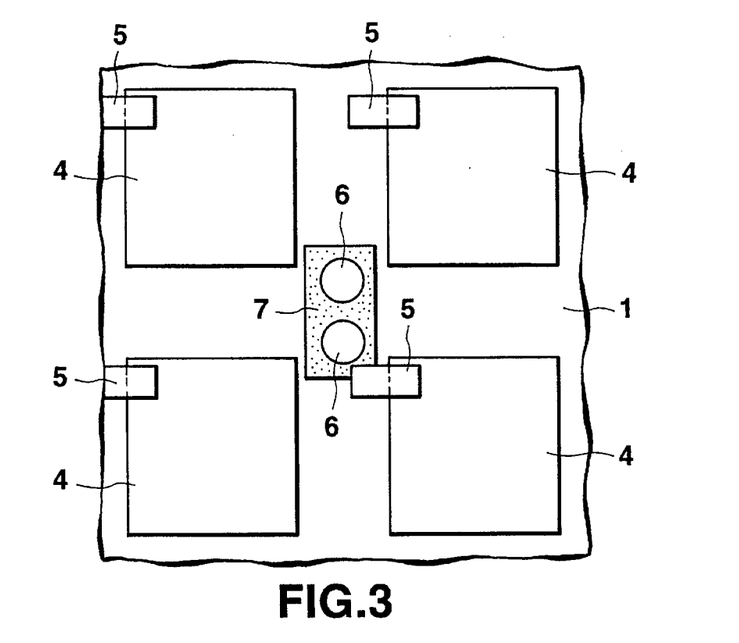
FIG. 3 is a plan view showing part of the embodiment of the polymer dispersed liquid crystal display device according to the present invention.
Figure 4:
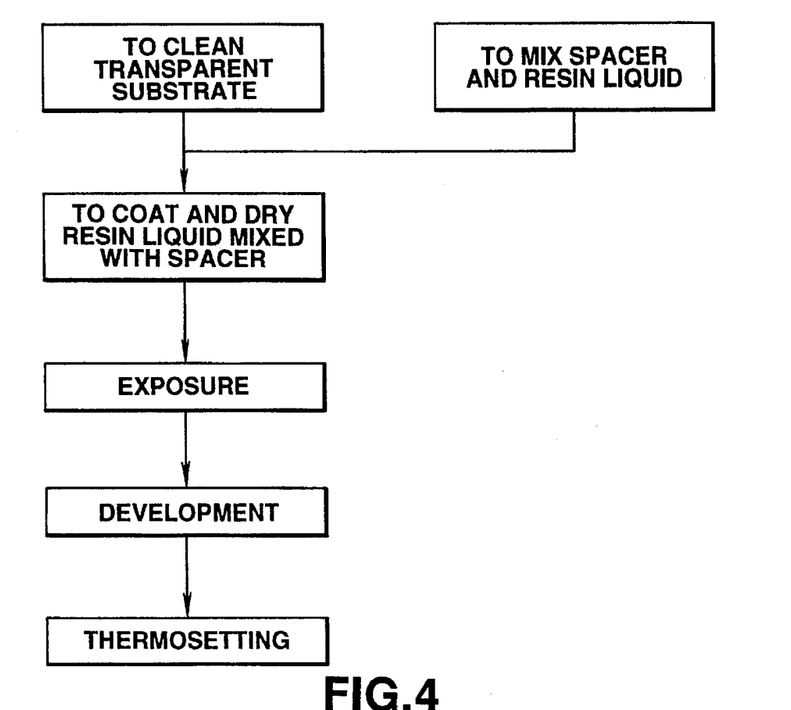
FIG. 4 is a block diagram showing a method of arranging spacers in the embodiment of the polymer dispersed liquid crystal display device according to the present invention.

A TFT-driven polymer dispersed liquid crystal display device according to an embodiment of the present invention has an arrangement as shown in FIGS. 1 to 3. Referring to FIG. 2, a pair of transparent substrates 1 and 2 made of glass or the like and opposing each other at a predetermined gap are bonded with each other at their peripheral portions through a frame-shaped seal member 3. As shown in FIG. 3, a plurality of pixel electrodes 4 are arranged on the counter surface of one substrate 1 opposing the other substrate 2 in a matrix form, and one TFT 5 is provided to each pixel electrode 4. The TFTs 5 are omitted in FIG. 2.

As shown in FIG. 1, a substrate gap regulating means for regulating the gap between the substrates 1 and 2 to a predetermined size is disposed in remaining regions B which are obtained by removing, from the region inside the frame-shaped seal member 3, pixel regions A corresponding to the pixel electrodes 4. Namely, the substrate gap regulating means is disposed in regions B between the regions A which are positioned on the pixel electrodes inside one frame-shaped seal member 3.

The substrate gap regulating means of this embodiment comprises a plurality of spacers 6 serving as the gap regulating members and resin films 7 serving as fixing members for fixing the spacers 6 to the surface of the substrate 1. The plurality of spacers 6 are fixed in the remaining regions B of the transparent substrate 1 through the resin films 7 at substantially the equal pitch, and the gap between the substrates 1 and 2 is maintained substantially the same size by the spacers 6. Spherical grass particles or short glass fibers are suitable as the material of the spacers 6, and a photosetting polymeric material, e.g., photosensitive polyimide, is suitable as the material of the resin films 7.

A black masks 8 serving as a light-shielding means are disposed in a grated manner in the remaining regions B of the counter surface of the other substrate 2 opposing the substrate 1 to exclude pixel regions A corresponding to the pixel electrodes. An insulating film 9 is formed on almost the enter portion of the counter surface of the substrate 2 to cover the black masks 8, and a flat counter electrode 10 is formed to cover almost the entire portion of the insulating film 9.

A polymer dispersed liquid crystal layer 11 is formed in a region defined by the substrates 1 and 2 and the seal member 3. The polymer dispersed liquid crystal layer 11 is obtained by photo-setting a polymeric material after a liquid crystal material is uniformly dispersed in the photo-setting polymeric material. The liquid crystal is held in the transparent polymeric layer as it is uniformly dispersed in it.

In the polymer dispersed liquid crystal display device having the arrangement as described above, signal voltages corresponding to display data are applied to the pixel electrodes 4 through the TFTs 5 serving as the switching elements, and electric fields are applied across the pixel electrodes 4 and the counter electrode 10 to correspond to the display data. When an electric field is not applied, the molecules of the liquid crystal in the polymer dispersed liquid crystal layer 11 are directed in various directions. In this state wherein the electric field is not applied, light incident on the polymer dispersed liquid crystal layer 11 is scattered by the light-scattering function caused by the liquid crystal and by the light-scattering function that occurs at the interface between the liquid crystal and the polymeric layer. Hence, the light transmittance is decreased, and if the liquid crystal display device is of a transmission type, it is set in the dark display state.

When an electric field equal to or exceeding the threshold voltage of the liquid crystal is applied across the pixel electrodes 4 and the counter electrode 10, the molecules of the liquid crystal are aligned uniformly to be perpendicular to the surfaces of the substrates 1 and 2, and the transmitted light is transmitted through the polymer dispersed liquid crystal layer 11 without substantially being subjected to the light-scattering function. Therefore, the light transmittance at the portion where the electric field is applied is increased, and if the liquid crystal display device is of a transmission type, it is set in the bright state.

The spacers 6 are arranged only in the remaining regions B and no spacers are present in the pixel regions A. Hence, when light is incident on the pixel regions A to which the electric field is not applied, the light is entirely scattered by the polymer dispersed liquid crystal layer 11 and emission thereof is suppressed. Accordingly, unlike in the conventional display device, bright spots corresponding to the shapes of the spacers 6 are not formed in the dark display region, and the entire portion of the dark display region is set in a uniform darkness, thereby reliably increasing the display quality. Of the light components incident on the remaining regions B, those incident on the spacers 6 are transmitted through the spacers 6 without being scattered. However, since these light components are shielded by the black masks 8, they will not be emitted, posing no problem. Although other light components incident on the remaining regions B are scattered by the polymer dispersed liquid crystal layer 11, their scattered light components are shielded by the black masks 8 so that they will not be emitted. In this manner, since the light incident on the remaining regions B is entirely reliably interfered with from being emitted by the black masks 8, the display contrast is improved, further improving the display quality of the TFT-driven polymer dispersed liquid crystal display device.

The spacers 6 may be formed by a non-transmitting material, e.g., a black material, or spacers having surfaces coated with black films may be used. In these cases, the spacers 6 also serve as the black mask, so that the black mask 8 need not be separately provided.

Of a method of manufacturing the polymer dispersed liquid crystal display device described above, a method of manufacturing the substrate 1 will be described with reference to FIG. 4 and FIGS. 5A to 5D. The pixel electrodes 4 are omitted in FIGS. 5A to 5D.

Figure 5A:
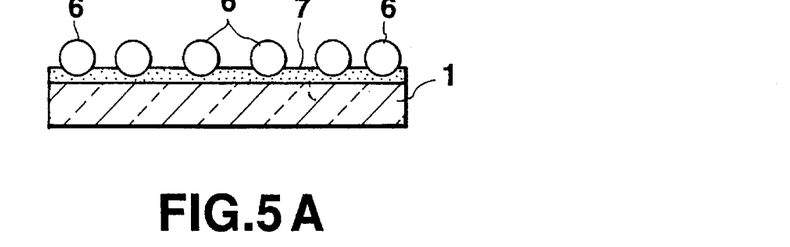
FIGS. 5A, 5B, 5C, and 5D are illustrations respectively showing the steps of arranging the spacers in the embodiment of the polymer dispersed liquid crystal display device according to the present invention.

First, the transparent substrate 1 on which the pixel electrodes 4 are formed is cleaned. The large number of spacers 6 are injected into the resin liquid of, e.g., a photosensitive polyimide precursor and mixed.

Thereafter, as shown in FIG. 5A, the resin liquid 7 of the photosensitive polyimide precursor mixed with the spacers 6 is coated on the entire surface of the transparent substrate 1 on which the pixel electrodes 4 are formed, and the resin liquid is dried, so that the large number of spacers 6 are brought into contact with the transparent substrate 1 through a resin film 7.

Figure 5B:
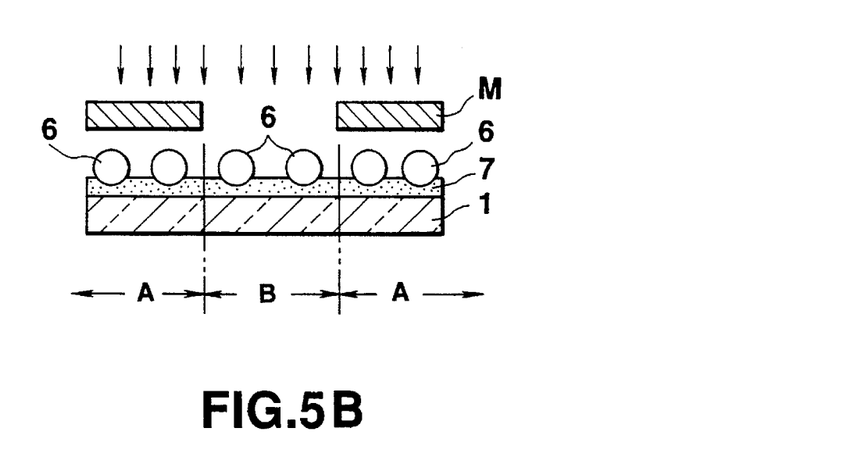

Then, as shown in FIG. 5B, a photomask M is arranged above or on the transparent substrate 1 to cover the pixel regions A with it, and the remaining regions B are exposed by being irradiated with light (ultraviolet rays). The photosensitive polyimide precursor as the resin film 7 is photocrosslinked by this exposure.

Figure 5C:
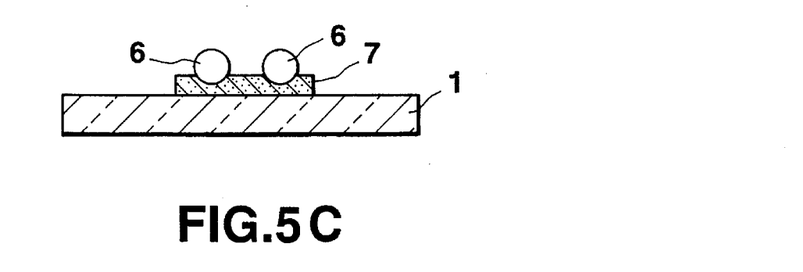
Figure 5D:
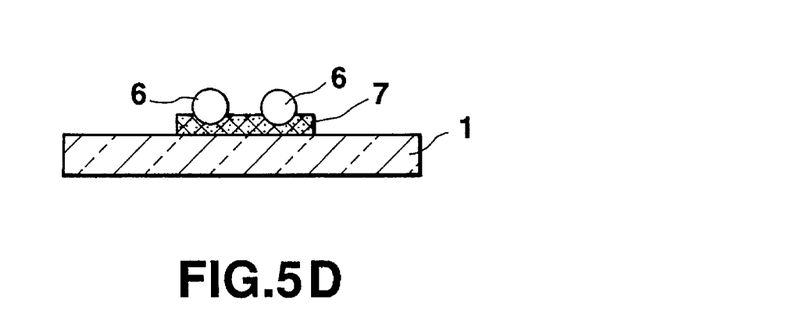

Then, as shown in FIG. 5C, the non-exposed portions of the resin film 7 are removed together with the spacers 6 at these portions by development to leave the resin films 7 and the spacers 6 at the exposed portions. As shown in FIG. 5D, the developed resin films 7 are calcined to transform the photosensitive polyimide precursor into the polyimide and set the resultant polyimide. Hence, the spacers 6 are fixed to the transparent substrate 1 by the resin films 7. In this manner, the spacers 6 are fixed to the specific portion of the transparent substrate 1, i.e., the remaining regions B to exclude the pixel regions A. A photoresist and the like may be used as the material of the resin films 7.

The steps of manufacturing the polymer dispersed liquid crystal display device by using the transparent substrate 1 fabricated in the above manner will be described with reference to FIGS. 6A to 6D. In FIGS. 6A to 6D, the pixel electrodes 4 and the counter electrode 10 are omitted.

Figure 6A:
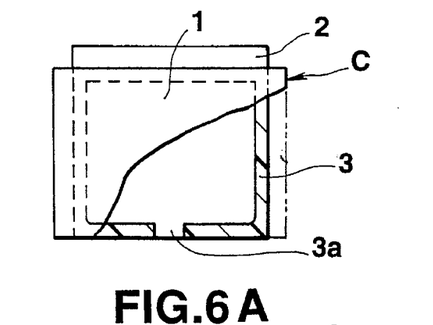
FIGS. 6A, 6B, 6C, and 6D are illustrations respectively showing the steps of an embodiment of a method of manufacturing the polymer dispersed liquid crystal display device according to the present invention.

First, as shown in FIG. 6A, the pair of transparent substrates 1 and 2 are bonded to each other through the seal member 3, thereby assembling a cell C. A mixture injection port 3a, formed by removing part of the seal member 3, is provided at a side portion of the cell C.

Figure 6B:
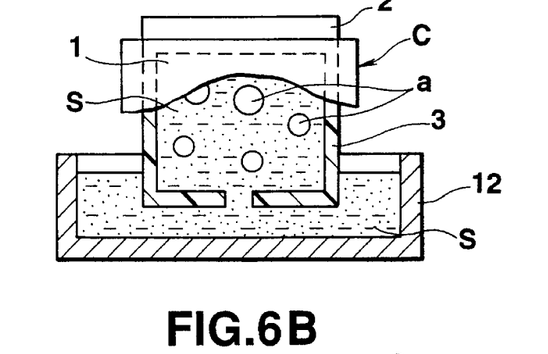

As shown in FIG. 6B, a solution mixture S of the liquid crystal and the photo-setting polymeric material is injected into the cell C in accordance with vacuum injection. This solution mixture S is obtained by mixing, in the photo-setting polymeric material, a liquid crystal material in a proportion equal to or exceeding its solubility at a normal temperature and a normal pressure, and heating the mixture to a temperature equal to or exceeding a soluble limit temperature as a lower limit temperature at which the two materials are dissolved in an environmental pressure, thereby dissolving the two materials. Note that a radical initiator for radical formation of the photo-setting polymeric material is added to the solution mixture S.

The solution mixture S is injected by setting the cell C in a vacuum tank (not shown), evacuating the interior of the tank to a vacuum state, dipping the injection port 3a of the cell C in the solution mixture S in a mixture bath 12, and thereafter decreasing the pressure in the interior of the tank to an atmospheric pressure (normal pressure) or a pressure slightly higher than that.

In this case, the solution mixture S in the mixture bath 12 is a mixture in which the liquid crystal is sufficiently dissolved. When this solution mixture S is injected into the cell C in accordance with vacuum injection process described above, the pressure of the mixture S injected into the cell C in the vacuum state is decreased to decrease its liquid crystal solubility. Then, an amount of liquid crystal exceeding this decreased solubility is precipitated, and the extra liquid crystal forms a liquid crystal mass $\underline{a}$ to be present in the mixture S in the scattered manner.

Figure 6C:
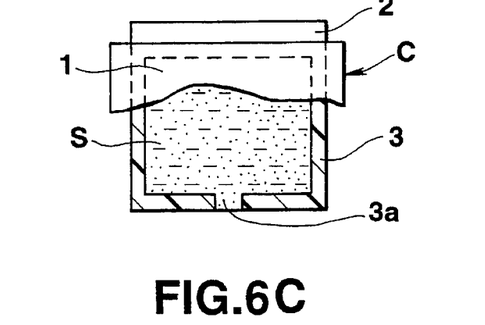

The cell C into which the solution mixture S is injected is separated from the vacuum tank, and the cell C is heated to increase the temperature of the solution mixture S in it until the precipitated liquid crystal is dissolved. FIG. 6C shows this state. When the temperature of the solution mixture S is increased, its liquid crystal solubility is increased along with the increase in temperature, and the liquid crystal, which has been precipitated by a decrease in solubility that occurred when the pressure was decreased upon injection of the solution mixture S into the cell C, is dissolved again. Thus, the solution mixture S in the cell C becomes a mixture in which the liquid crystal is uniformly dissolved in the photo-setting polymeric material.

At this time, it suffices if the temperature of the solution mixture S is equal to or exceeds the temperature at which the precipitated liquid crystal is dissolved in the mixture S again. If the N—I point temperature of the liquid crystal is higher than this re-soluble temperature, the temperature of the solution mixture S is preferably increased to a temperature equal to or exceeding the N—I point temperature due to the following reason.

Namely, in the N (nematic) phase, a force for directing the major axes of the molecules in a predetermined direction is generated among the molecules of the liquid crystal, whereas in the I (isotropic) phase, a force for keeping the individual molecules of the liquid crystal in order does not act among them. Therefore, when the temperature of the solution mixture S is increased to the temperature equal to or exceeding the N—I point temperature, the precipitated liquid crystal is re-dissolved more uniformly.

Figure 6D:
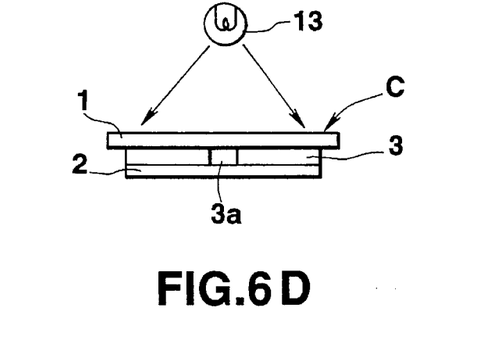
Figure 7:
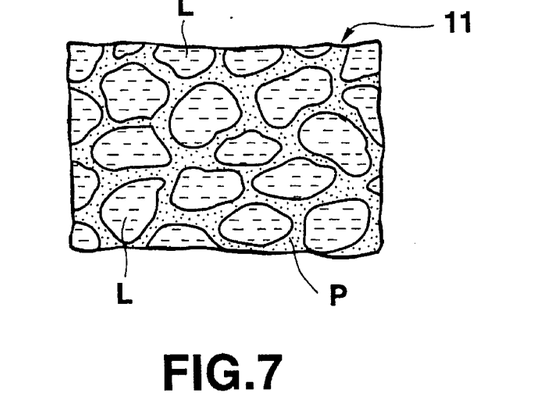
FIG. 7 is a schematic sectional view showing a polymer dispersed liquid crystal layer in the polymer dispersed liquid crystal display device according to the present invention.

After the precipitated liquid crystal is dissolved in this manner, the solution mixture S is kept at a temperature equal to or exceeding the soluble limit temperature so that the liquid crystal will not be precipitated again. In this state, as shown in FIG. 6D, ultraviolet rays are radiated from a light source 13 to the cell C in order to photopolymerize the photo-setting polymeric material of the solution mixture S in the cell C, thereby forming the polymer dispersed liquid crystal layer 11 as shown in FIG. 7.

This photopolymerization is performed by decreasing the temperature of the solution mixture S as much as possible within a range in which the liquid crystal L can be sufficiently dissolved. This is because the higher the temperature of the solution mixture S, the larger the amount of ultraviolet rays necessary for photopolymerizing the photo-setting polymeric material P. If ultraviolet rays are radiated in an excessive amount, degradation in liquid crystal is quickened. Therefore, photopolymerization of the photo-setting polymeric material P is preferably performed in a small amount of ultraviolet rays by decreasing the temperature as much as possible.

When the photo-setting polymeric material P is photopolymerized while the liquid crystal is in the I phase, thus forming the polymer dispersed liquid crystal layer 11, the liquid crystal is partly photopolymerized as it is still dissolved in the polymeric material, and causes phase separation to decrease the proportion of the liquid crystal serving as the nematic liquid crystal, thereby increasing the drive voltage of the liquid crystal display device. Therefore, photopolymerization of the photo-setting polymeric material P is preferably performed after the temperature of the solution mixture S is decreased to a temperature at which the liquid crystal is restored to the N phase.

If the N—I point temperature of the liquid crystal is lower than the liquid crystal soluble limit temperature of the solution mixture S, when the cell temperature is decreased to a temperature equal to or lower than the N—I point temperature, the liquid crystal in the solution mixture S is precipitated again. In this case, the temperature of the solution mixture S is set in a range with which the liquid crystal and the photo-setting polymeric material are dissolved with each other, and photopolymerization is performed while the liquid crystal is in the I phase.

After the polymer dispersed liquid crystal layer 11 is formed in this manner, the injection port 3a of the cell C is sealed with a photo-setting resin or the like, thereby completing the polymer dispersed liquid crystal display device shown in FIG. 2.

More specifically, according to the method of manufacturing the polymer dispersed liquid crystal display device, after the solution mixture S obtained by sufficiently dissolving the liquid crystal in the photosetting resin is injected into the cell C in accordance with vacuum injection, the temperature of the solution mixture S is increased to increase its liquid crystal solubility so that the liquid crystal precipitated during injection is dissolved, and thereafter the photosetting polymeric material is photopolymerized.

In this manner, when the temperature of the solution mixture S is increased to increase the liquid crystal solubility, the liquid crystal, which has been precipitated by a decrease in solubility that occurs due to a decrease in pressure upon injection of the solution mixture S into the cell C, is dissolved again. If the photo-setting polymeric material is photopolymerized in this dissolved state, the polymer dispersed liquid crystal layer 11 in which the liquid crystal L is uniformly dispersed in the polymeric material P, as shown in FIG. 7, can be obtained. Therefore, according to this manufacturing method, even if the proportion of the liquid crystal L is increased, the polymer dispersed liquid crystal layer 11 in which the liquid crystal is uniformly dispersed can be formed.

Hence, according to this manufacturing method, a polymer dispersed liquid crystal display device requiring a low drive voltage while having uniform optical characteristics and a good display quality free from display non-uniformity can be obtained.

The following Table [1] shows comparison of the polymerized state of the polymer dispersed liquid crystal layer between polymer dispersed liquid crystal display devices manufactured in accordance with the above manufacturing method and a polymer dispersed liquid crystal display device manufactured without performing temperature rise treatment which is performed in the above manufacturing method.

TABLE 1

|  | Comparative Example | Example 1 | Example 2 | Example 3 |
| --- | --- | --- | --- | --- |
| Liquid Crystal Solubility in Room Temperature (wt %) | 70 | 70 | 70 | 70 |
| Actual Proportion of Liquid Crystal (wt %) | 70 | 70 | 80 | 90 |
| Temperature Rise Treatment | No | Yes | Yes | Yes |

TABLE 1-continued

|  | Comparative Example | Example 1 | Example 2 | Example 3 |
|---|---|---|---|---|
| Uniformity of Liquid Crystal Dispersed State | Bad | Good | Good | Good |

In Table [1], the Comparative Example is a case wherein the temperature rise treatment was not performed, and Examples 1 to 3 are cases wherein the temperature rise treatment was performed. In either case, the solution mixture of the liquid crystal and the photo-setting polymeric material was prepared by using the same liquid crystal and the same polymeric material.

As in Table [1], in the Comparative Example wherein the temperature rise treatment was not performed, even when the proportion of the liquid crystal of the solution mixture was the same as the liquid crystal solubility (70 wt % in this case) at a normal temperature and a normal pressure, the liquid crystal dispersed state of the polymer dispersed liquid crystal layer becomes non-uniform. Then, the optical characteristics (transmitting and scattering characteristics) of the liquid crystal display device became non-uniform to cause display non-uniformity.

In contrast to this, in Example 1, although the proportion of the liquid crystal of the solution mixture was set to be the same as the liquid crystal solubility at a normal temperature and a normal pressure, the liquid crystal dispersed state was uniform. Thus, the optical characteristics of the liquid crystal display device were uniform, thereby obtaining good display free from display non-uniformity.

In Example 2, the proportion of the liquid crystal of the solution mixture was set to be higher (80 wt % in this case) than the liquid crystal solubility at a normal temperature and a normal pressure, and in Example 3, the proportion of the liquid crystal in the solution mixture was set to be further higher (90 wt % in this case) than this. However, the liquid crystal dispersed state was uniform both in Examples 2 and 3 as well. Therefore, the optical characteristics of the liquid crystal display device were uniform, thereby obtaining good display free from display non-uniformity.

Furthermore, in Examples 2 and 3, since the proportion of the liquid crystal of the solution mixture was set to be higher than the liquid crystal solubility at a normal temperature and a normal pressure, the proportion of the liquid crystal of the formed polymer dispersed liquid crystal layer was large, so that the drive voltage of the liquid crystal display device was set to be a low value.

In the above manufacturing method, the temperature rise treatment of the solution mixture S before injection may be omitted, and the temperature of the solution mixture S may be increased after the solution mixture S is injected into the liquid crystal cell C in a vacuum pressure until the photo-setting polymeric material and the liquid crystal material are dissolved with each other.

Figure 8:
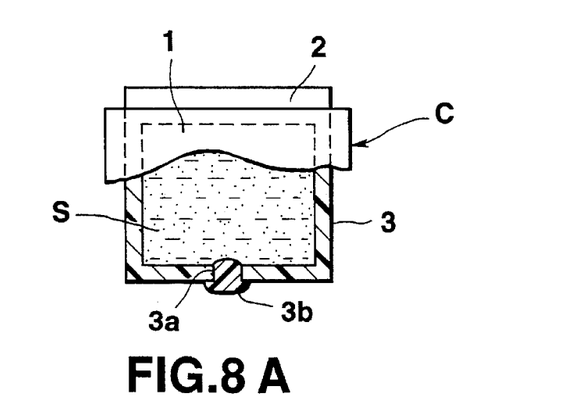
FIGS. 8A and 8B are illustrations respectively showing the steps of another embodiment of a method of manufacturing a polymer dispersed liquid crystal display device according to the present invention.
Figure 8B:
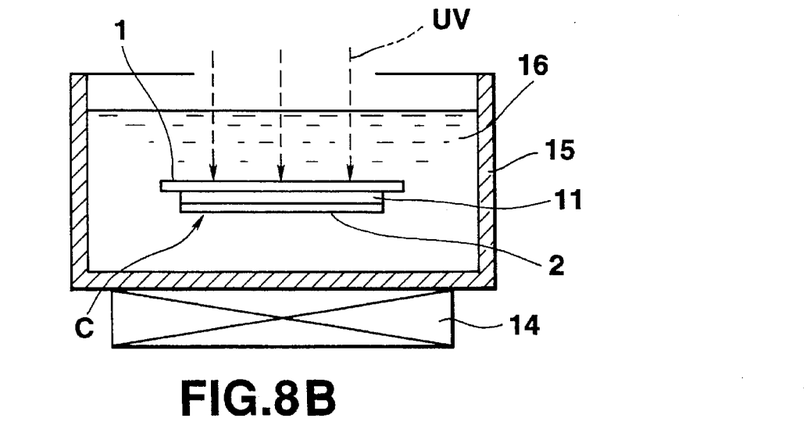

Another embodiment of a method of manufacturing a polymer dispersed liquid crystal display device according to the present invention will be described with reference to FIGS. 8A and 8B. In FIGS. 8A and 8B, pixel electrodes and a counter electrode are omitted.

The manufacturing method of this embodiment is the same as the above manufacturing method from the step of assembling the cell up to the step of injecting the solution mixture of the liquid crystal and the photosetting polymeric material into the cell and increasing the temperature. After the temperature of the solution mixture injected into the cell is increased to a temperature equal to or exceeding the liquid crystal soluble limit temperature to dissolve the photosetting polymeric material and the liquid crystal with each other, a liquid crystal injection port $3a$ is sealed with a seal member $3b$ made of a heat-polymerizable resin, as shown in FIG. 8A. Thereafter, the photo-setting polymeric material is photopolymerized while dispersedly mixing the solution mixture S sealed in a cell C.

As shown in FIG. 8B, this photopolymerization is performed by dipping the cell C in a vibrating medium 16 in a vibration tank 15 to which an ultrasonic vibrator 14 is mounted, and radiating ultraviolet rays UV to the cell C from above the vibration tank 15 while vibrating the ultrasonic vibrator 14 in order to vibrate the cell C by the ultrasonic wave propagating in the vibrating medium 16. As the vibrating medium 16 in the vibration tank 15, a transparent liquid inactive to ultraviolet rays, e.g., IPA (isopropyl alcohol) is used.

When the ultraviolet rays UV are radiated onto the solution mixture S in the cell C in this manner, the double bond of the polymer which is in the state of a monomer or oligomer is disengaged to form radicals. Then, the polymeric molecules are polymerized by radical polymerization in which radicals of adjacent polymeric molecules are bonded with each other, so that the polymeric material P and the liquid crystal L cause phase separation, as shown in FIG. 7, thereby forming the polymer dispersed liquid crystal layer 11 in which the liquid crystal L is dispersed in the polymeric material P.

In this case, radical polymerization of the polymeric molecules with each other is interfered with by the liquid crystal. However, when photopolymerization is performed while vibrating the cell C by ultrasonic waves, radical bonding of the polymeric molecules with each other is promoted by the agitating effect of the mixture S caused by ultrasonic vibration. Then, the function of the liquid crystal to interfere with radical polymerization of the polymeric molecules with each other is inversely decreased, so that the adjacent polymeric molecules are well subjected to radical bonding. In addition, the efficiency of promoting radical formation caused by the radical initiator added to the mixture S is further promoted by the ultrasonic vibrating effect.

As a result, the radical bond of the adjacent polymeric molecules with each other is less disengaged and the radicals of the same polymeric molecule are less re-bonded, so that the polymeric molecules are subjected to uniform radical polymerization throughout the entire portion of the mixture S, thereby obtaining the polymer dispersed liquid crystal layer 11 having a uniform structure.

Therefore, according to this manufacturing method, a polymer dispersed liquid crystal display device that has a polymer dispersed liquid crystal layer 11 in which the liquid crystal is held in the set polymeric material layer in the uniformly dispersed state and that provides a uniform photoelectric effect and a high display quality free from display non-uniformity can be obtained.

In the above embodiment, the solution mixture S is sealed in the cell C in accordance with vacuum injection. However, the solution mixture S may be sealed in the cell C by dropping it on one substrate when the pair of substrates 1 and 2 are bonded with each other through the seal member 3 to assemble the cell C.

Figure 9:
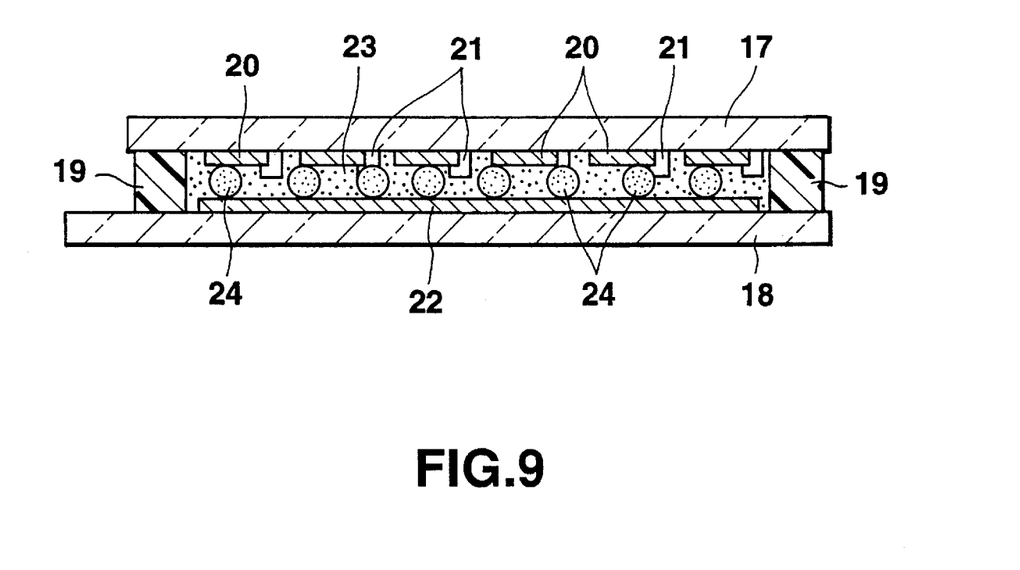
FIG. 9 is a sectional view showing the entire structure of another embodiment of a polymer dispersed liquid crystal display device according to the present invention.

Another embodiment of a polymer dispersed liquid crystal display device according to the present invention will be described with reference to FIG. 9.

A pair of transparent substrates 17 and 18 made of glass or the like and opposing each are bonded with each other at their peripheral portions through a frame-shaped seal member 19. A plurality of pixel electrodes 20 are arranged on the counter surface of one substrate 17 opposing the other substrate 18 in a matrix form, and one TFT 21 is provided to each pixel electrode 20. A flat counter electrode 22 is formed on almost the entire counter surface of the other substrate 18 opposing the substrate 17.

A polymer dispersed liquid crystal layer 23 is provided in the region surrounded by the transparent substrates 17 and 18 and the seal member 19, and spacers 24 serving as the substrate gap regulating members are distributed between the transparent substrates 17 and 18. A material having high light-scattering performance, e.g., spherical grass particles having rough surfaces, is used to form the spacers 24.

A polymer dispersed liquid crystal layer 23 is obtained by photo-setting a polymeric material when the liquid crystal material is uniformly dispersedly mixed in the photo-setting polymeric material. The liquid crystal is held in the transparent polymeric layer in a uniform dispersed distribution state.

In this liquid crystal display device, since the substrate gap regulating spacers 24 have high light-scattering performance, even light passing through the portions where the spacers 24 are located is scattered in the same manner as in light scattering that occurs at a portion of the polymer dispersed liquid crystal layer 23 to which an electric field is not applied. Then, the entire portion of the dark display region has a substantially uniform darkness.

Therefore, according to this liquid crystal display device, even when the display device is TFT-driven, bright spots in the dark display region can be eliminated to improve the display quality, despite that the transparent substrate gap regulating spacers 24 are distributed between the pair of substrates 17 and 18.

At portions of the polymer dispersed liquid crystal layer 23 where an electric field is not applied, light passing through portions where the spacers 24 do not exist is transmitted through the polymer dispersed liquid crystal layer 23 without substantially being subjected to the light-scattering function, while light passing through portions where the spacers 24 exist is scattered in the manner as described above. Although shades corresponding to the shapes of the spacers 24 are formed in the bright display region, these shades in the bright display region do not substantially stand out when compared to the bright spots in the dark display region which are generated in the conventional liquid crystal display device. Therefore, the shades in the bright display region do not adversely affect the display quality.

Especially, when the polymer dispersed liquid crystal display device according to the present invention is applied to a projection type display system, since a display image is enlarged and projected to the screen surface, the shades in the bright display region are blurred and thus less stand out, which is convenient.

The present invention can similarly be applied to a polymer dispersed liquid crystal display device in which capsules containing the liquid crystal are held in a polymeric material in a uniform distribution state.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of manufacturing a polymer dispersed liquid crystal display device in which a polymer dispersed liquid crystal layer, having a liquid crystal held in a polymeric layer in a dispersed state, is provided between a pair of substrates having electrodes thereon and wherein said substrates are arranged to oppose each other with a space therebetween, the method comprising:

a cell formation step of forming a liquid crystal cell by filling a solution mixture, in which a photo-setting polymeric material and a liquid crystal material are dissolved with each other, in said space between said pair of opposed substrates, and maintaining the filled solution mixture at a first temperature not less than a soluble limit temperature which is a lower limit temperature at which said two materials are dissolved with each other in an environmental pressure; and a setting step of setting said photo-setting polymeric material by radiating light on said solution mixture, said setting step including cooling the solution mixture filled between said opposed substrates to a second temperature which is lower than said first temperature and which is in a temperature range having a lower limit which is not less than the soluble limit temperature and an upper limit which is less than said temperature of the solution mixture in said cell formation step.

2. A method according to claim 1, wherein the cell formation step further comprises:

a filling step of filling said solution mixture, containing said two materials at a proportion not less than a solubility at a normal temperature and a normal pressure, between said pair of opposed substrates; and a temperature rise step of increasing the temperature of said solution mixture to said first temperature of not less than the soluble limit temperature.

3. A method according to claim 2, wherein said setting step comprises a step of decreasing the temperature of said solution mixture within a range not less than the soluble limit temperature and a step of polymerizing said photo-setting polymeric material by radiating light on said solution mixture, a temperature of which is decreased.

4. A method according to claim 2, wherein said cell formation step has the filling step and the temperature rise step executed after the filling step.

5. A method according to claim 2, wherein said cell formation step has the filling step, the temperature rise step executed before the filling step and the other temperature rise step executed after the filling step.

6. A method according to claim 5, wherein said setting step comprises a step of decreasing the temperature of said solution mixture within a range not less than the soluble limit temperature and a step of polymerizing said photo-setting polymeric material by radiating light onto said solution mixture.

7. A method according to claim 5, wherein the cell formation step has a step of increasing the temperature of said solution mixture to a temperature not less than the soluble limit temperature in the temperature rise step which is executed before the filling step and increasing the temperature of said solution mixture to a temperature not less than an N—I point of said liquid crystal material in the temperature rise step which is executed after the filling step.

8. A method according to claim 2, wherein said temperature rise step has a step of increasing the temperature of said solution mixture to a temperature not less than an N—I point of said liquid crystal material.

9. A method according to claim 8, wherein said setting step comprises a step of decreasing the temperature of said solution mixture within a range not less than the N—I point and a step of polymerizing said photo-setting polymeric material by radiating light onto said solution mixture.

10. A method according to claim 8, wherein said cell formation step has the filling step and the temperature rise step executed after the filling step.

11. A method according to claim 8, wherein said cell formation step has the filling step, the temperature rise step executed before the filling step and the other temperature rise step executed after the filling step.

12. A method according to claim 1, wherein said setting step has a step of polymerizing said polymeric material by radiating light onto said solution mixture while dispersedly mixing said solution mixture.

13. A method according to claim 12, wherein the dispersed mixing is performed in accordance with ultrasonic vibration.

14. A method of manufacturing a polymer dispersed liquid crystal display device in which a polymer dispersed liquid crystal layer, having a liquid crystal held in a polymeric layer in a dispersed state, is provided between a pair of substrates having electrodes thereon and wherein said substrates are arranged to oppose each other with a space therebetween, the method comprising:

a cell formation step of forming a liquid crystal cell, said cell formation step including a filling step of filling a solution mixture, containing a photo-setting polymeric material and a liquid crystal material at a proportion not less than a solubility at a normal temperature and a normal pressure, in said space between said pair of opposed substrates in a vacuum state; and a temperature rise step of increasing the temperature of said solution mixture to a temperature not less than an N—I point of said liquid crystal material, which is not less than a soluble limit temperature which is a lower limit temperature at which the two materials are dissolved with each other in an environmental pressure; and a setting step of setting said photo-setting polymeric material, said setting step including a step of decreasing the temperature of said solution mixture within a range between not more than the N—I point and not less than the soluble limit temperature; and a step of polymerizing said photo-setting polymeric material by radiating light onto said decreased temperature solution mixture.

15. A method according to claim 14, wherein said cell formation step further includes a temperature rise step executed before the filling step and another temperature rise step executed after the filling step.

16. A method according to claim 15, wherein the cell formation step further includes a step of increasing the temperature of said solution mixture to a temperature more than the soluble limit temperature in the temperature rise step which is executed before the filling step, and increasing the temperature of said solution mixture to a temperature of said solution mixture which is not less than an N—I point of said liquid crystal material in the temperature rise step which is executed after the filling step.

17. A method of manufacturing a polymer dispersed liquid crystal display device in which a polymer dispersed liquid crystal layer, having a liquid crystal held in a polymer layer in a dispersed state, is provided between a pair of substrates having electrodes thereon and wherein said substrates are arranged to oppose each other with a space therebetween, the method comprising:

a cell formation step of forming a liquid crystal cell by filling a solution mixture, in which a photo-setting polymeric material and a liquid crystal material are dissolved with each other, in said space between said pair of opposed substrates, the solution mixture having a temperature greater than an N—I point of said liquid crystal material; and a setting step of setting said photo-setting polymeric material, said setting step including a step of decreasing the temperature of said solution mixture within a range which is not more than the N—I point, and a step of polymerizing said photosetting polymeric material by radiating light onto said decreased temperature solution mixture.

18. A method according to claim 17, wherein:

said N—I point is greater than a soluble limit temperature which is a lower limit temperature at which the two materials are dissolved with each other in an environmental pressure; and said setting step of setting said photo-setting polymeric material further includes a step of decreasing the temperature of said solution mixture within a range of not more than the N—I point and not less than the soluble limit temperature.

19. A method according to claim 17, wherein said step of decreasing the temperature of said solution mixture comprises decreasing said temperature to a temperature value less than that of the N—I transition point.

\* \* \* \* \*